United States Patent
Dasari et al.

(10) Patent No.: US 9,122,893 B1
(45) Date of Patent: Sep. 1, 2015

(54) TRUSTED PLATFORM MODULE SWITCHING

(71) Applicant: INTERNATIONAL BUSINESS MACHINES CORPORATION, Armonk, NY (US)

(72) Inventors: Shiva R. Dasari, Austin, TX (US); Raghuswamyreddy Gundam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/188,111

(22) Filed: Feb. 24, 2014

(51) Int. Cl.
*H04L 9/00* (2006.01)
*G06F 21/71* (2013.01)
*G06F 21/57* (2013.01)

(52) U.S. Cl.
CPC ............... *G06F 21/71* (2013.01); *G06F 21/57* (2013.01)

(58) Field of Classification Search
CPC ........................................................ G06F 21/57
USPC .......................................................... 713/189
See application file for complete search history.

(56) References Cited

U.S. PATENT DOCUMENTS

| | | | |
|---|---|---|---|
| 7,900,058 B2 * | 3/2011 | Mabayoje et al. ............ | 713/189 |
| 8,032,741 B2 | 10/2011 | Smith | |
| 2007/0168574 A1 | 7/2007 | Martinez et al. | |

OTHER PUBLICATIONS

Anonymous, "TPM 2.0 TCG Physical Presence Interface 1.2 Test", Microsoft Corporation, Last Updated Jul. 26, 2013, pp. 1-1.
Awk, "alea: Samsung TPM chips . . ." Investorhub.com, Investorhub.com, Inc., Nov. 15, 2011, pp. 1-4.
Anonymous, "Windows 8 Boot Security FAQ", Microsoft, Retrieved Oct. 11, 2013, pp. 1-2.
Trusted Computing Group, Inc., "TPM 2.0 Library Specification FAQ", Trusted Computing Group, Inc., Retrieved Oct. 11, 2013, pp. 1-4.
NTDEV Member 132188, "Question for TPM Support in WIN8" Osronline.com, Open Systems Resources, Inc., Mar. 14, 2012, pp. 1-1.
Trusted Computing Group, Inc., "TCG PC Client Specific TPM Interface Specification (TIS)", Trusted Computing Group, Inc., 2005, pp. 1-15.

* cited by examiner

*Primary Examiner* — Longbit Chai
(74) *Attorney, Agent, or Firm* — Law Office of Jim Boice (57) ABSTRACT

A computer system comprises a Trusted Platform Module System (TPMS). The TPMS comprises a first Trusted Platform Module (TPM) and a second TPM, which comports with a different TPM specification than that followed by the first TPM. A physical presence input device receives a local physical change signal that proves a local physical presence of a user at the computer system. A toggle input device, which requires the local physical change signal, causes the state being output from the GPIO pin on the first TPM to switch from a first state to a second state. This change of state causes a TPM switch to selectively decouple the first TPM from a central processing unit and to couple the second TPM to the central processing unit.

17 Claims, 6 Drawing Sheets

| TPM 1.2 GPIO_00 | TPM 2.0 GPIO_00 | TPM SELECT | TPM Selected |
|---|---|---|---|
| 0 | 0 | 0 | TPM 1.2 |
| 0 | 1 | 1 | TPM 2.0 |
| 1 | 0 | 1 | TPM 2.0 |
| 1 | 1 | 0 | TPM 1.2 |

TRUSTED PLATFORM MODULE SWITCHING

BACKGROUND

The present disclosure relates to the field of computing hardware, and specifically to cryptographic devices. Still more specifically, the present disclosure relates to Trusted Platform Module (TPM) devices within a computer system.

A Trusted Platform Module (TPM) is a hardware security device found on both client devices as well as server devices. The TPM includes a cryptographic processor that is able to generate a random number, an RSA key, an SHA-1 key, and an encryption-decryption-signature engine. The TPM also includes persistent memory, which stores endorsement keys (i.e., public/private key pairs in which the private key never leaves the TPM) as well as a storage root key (often defined by a user to protect TPM keys that are created by applications, so that these application-created keys cannot be used without first being decrypted by the user-created storage root key). Also within the TPM is a non-volatile (NV) memory, in which are stored platform configuration registers (for storing metrics that describe the system to which the TPM is assigned/affixed), attestation identity keys (for encrypting hashes created from descriptors of hardware and software resources within the system), and storage keys (for encrypting and decrypting data being stored in hard drives within the system). All input/output to the cryptographic processors and memories within the TPM are via a secured input/output interface, which requires a trust relationship with the device/user who is accessing the TPM.

SUMMARY

In one embodiment of the present invention, a computer system comprises a Trusted Platform Module System (TPMS), wherein the TPMS comprises: a first Trusted Platform Module (TPM), wherein the first TPM is a hardware module that comprises a first secure cryptographic processor that provides a first set of cryptology services as defined by a first TPM specification; a first index register within the first TPM, wherein the first index register is a hardware register that controls a state of an output from a general purpose input/output (GPIO) pin on the first TPM; a second TPM, wherein the second TPM is a hardware module that comprises a second secure cryptographic processor that provides a second set of cryptology services as defined by a second TPM specification, wherein the second TPM specification is different from the first TPM specification; a toggle input device, wherein the toggle input device causes the state being output from the GPIO pin on the first TPM to switch from a first state to a second state; a physical presence detection device, wherein the physical presence detection device detects a local physical change to the computer system to prove a local physical presence of a user at the computer system, and wherein proof of the local physical presence of the user is required by the toggle input device to change the state, being output from the GPIO pin on the first TPM, from the first state to the second state; and a TPM switch for selectively coupling the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state.

In one embodiment of the present invention, a hardware description language (HDL) design structure is encoded on a machine-readable data storage medium. The HDL design structure comprises elements that, when processed in a computer-aided design system, generate a machine-executable representation of a system, wherein the system comprises a Trusted Platform Module System (TPMS), and wherein the TPMS comprises: a first Trusted Platform Module (TPM), wherein the first TPM is a hardware module that comprises a first secure cryptographic processor that provides a first set of cryptology services as defined by a first TPM specification; a first index register within the first TPM, wherein the first index register is a hardware register that controls a state of an output from a general purpose input/output (GPIO) pin on the first TPM; a second TPM, wherein the second TPM is a hardware module that comprises a second secure cryptographic processor that provides a second set of cryptology services as defined by a second TPM specification, wherein the second TPM specification is different from the first TPM specification; a toggle input device, wherein the toggle input device causes the state being output from the GPIO pin on the first TPM to switch from a first state to a second state; a physical presence detection device, wherein the physical presence detection device detects a local physical change to the computer system to prove a local physical presence of a user at the computer system, and wherein proof of the local physical presence of the user is required by the toggle input device to change the state, being output from the GPIO pin on the first TPM, from the first state to the second state; and a TPM switch for selectively coupling the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state.

In one embodiment of the present invention, a method is presented for toggling between Trusted Platform Modules (TPMs) in a computer system, where the computer system comprises a Trusted Platform Module System (TPMS). The method comprises: populating, by one or more processors, a first index register within a first TPM, wherein the first TPM is a hardware module within the computer system, wherein the first TPM comprises a first secure cryptographic processor that provides a first set of cryptology services as defined by a first TPM specification, and wherein the first index register is a hardware register that stores a state of an output from a general purpose input/output (GPIO) pin on the first TPM; populating, by one or more processors, a second index register within a second TPM, wherein the second TPM is a hardware module that comprises a second secure cryptographic processor that provides a second set of cryptology services as defined by a second TPM specification, that is subsequent to the first TPM specification, and wherein the second index register is a hardware register that stores a state of an output from a general purpose input/output (GPIO) pin on the second TPM; receiving, by a hardware toggle input device, a signal indicating that the state being output from the GPIO pin on the first TPM is being switched from a first state to a second state; receiving, by a physical presence input device, a local physical change signal that proves a presence of a user at the computer system, wherein the local physical change to the physical present input device is required by the toggle input device to change the state being output from the GPIO pin on the first TPM from the first state to the second state; and selectively coupling, by a TPM switch, the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
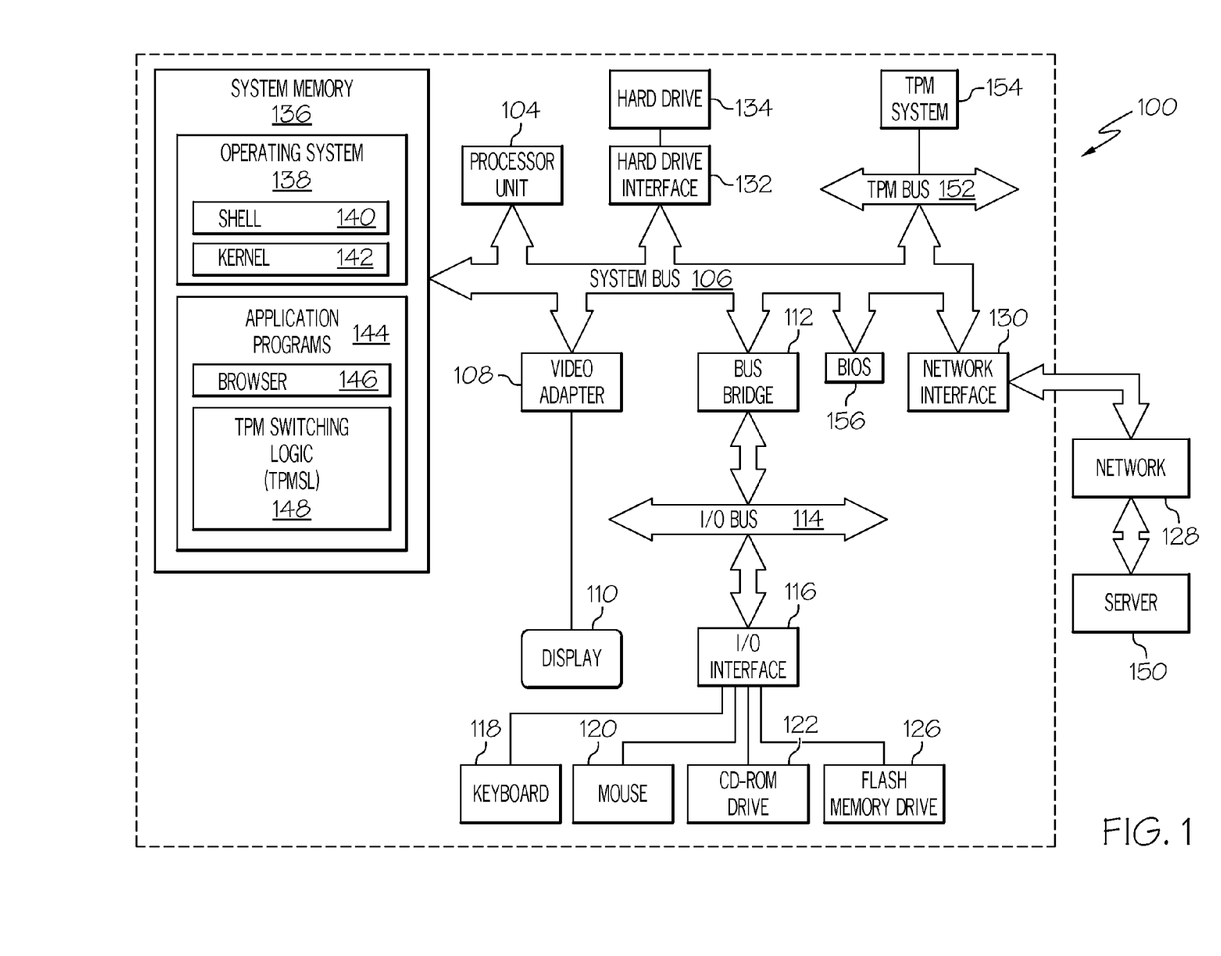
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Trusted Platform Module Switching Logic (TPMSL) 148, which, in one embodiment, executes the process described below in FIG. 3 and/or FIG. 6. In one embodiment, computer 100 is able to download TPMSL 148 from service provider server 150, preferably in an "on demand" basis.

Note that computer 100 also includes a Trusted Platform Module (TPM) bus 152, which couples the system bus 106 to a TPM System (TPMS) 154. The TPMS 154 is a system that contains one or more TPMs, which are cryptology-directed systems for providing security (e.g., encryption, password protection, etc.) to the computer 100. Additional detail of an exemplary TPMS 154 is presented in FIG. 3.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Also within computer 100 is a Basic Input/Output System (BIOS), depicted as BIOS 156. BIOS 156, also known as a system BIOS, is firmware (i.e., software stored on persistent memory) that initializes hardware components within computer 100 at startup (also known as "booting up"). BIOS 156 also contains logic known as a Core Root of Trust for Measurement (CRTM), which is not depicted in FIG. 1, but is depicted in, and discussed with reference to, FIG. 3 as CRTM 322.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
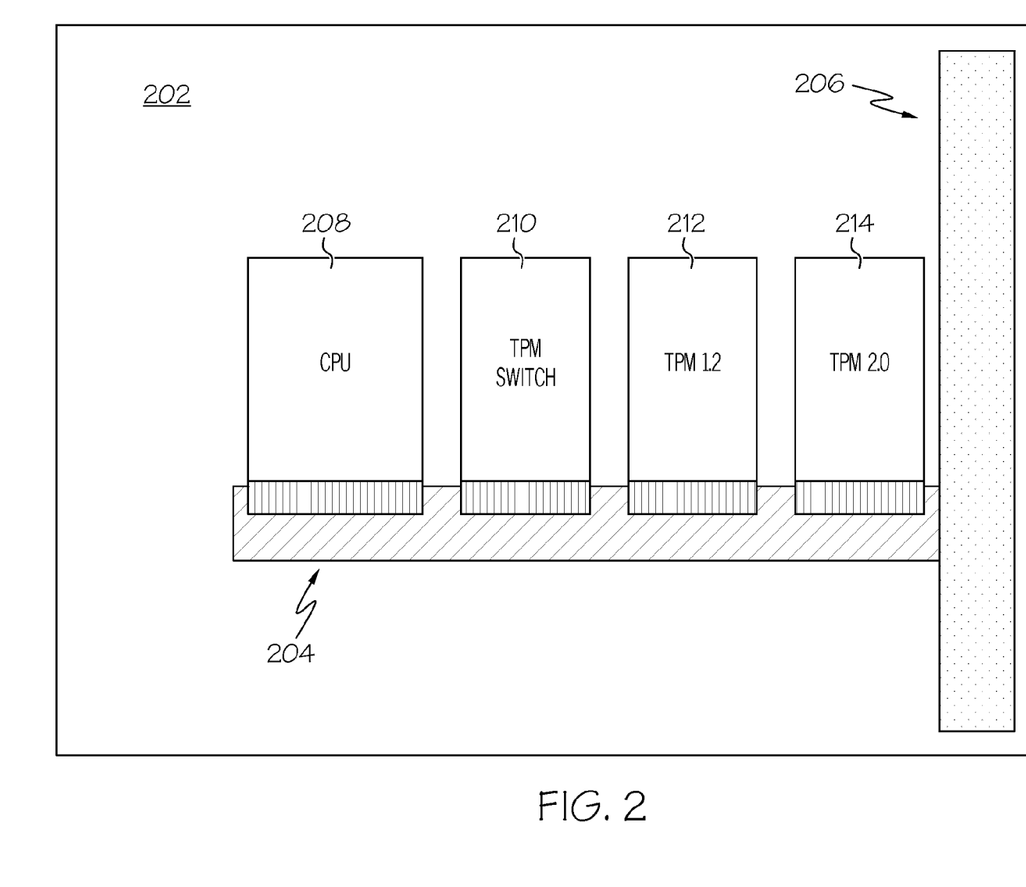
FIG. 2 illustrates an exemplary blade chassis in which the present invention may be implemented and/or utilized.

With reference now to FIG. 2, an exemplary blade chassis 202 in which the present invention may be implemented and/or utilized is presented. Blade chassis 202 is a structure that provides power, cooling, network connections, and/or management to multiple server blades, including the depicted server blade 204, which is coupled to a backplane 206 in the blade chassis 202. Attached to the server blade 204 is at least one central processor, such as the depicted central processing unit (CPU) 208. Coupled to CPU 208 is a Trusted Platform Module (TPM) switch 210, which selectively couples CPU 208 to either Trusted Platform Module (TPM) 212 or TPM 214. In one embodiment, TPM 212 comports with Version 1.2 of the TPM specification, while TPM 214 comports with Version 2.0 of the TPM specification. Note, however, that TPM 214 is not backwards compatible with TPM 212 (i.e., TPM 214 does not contain all of the features and/or services provided by TPM 212). Additional detail of the selective switching between TPM 212 and TPM 214, as well as the exemplary structure and function of TPM 212 and TPM 214, is presented in FIG. 3.

Figure 3:
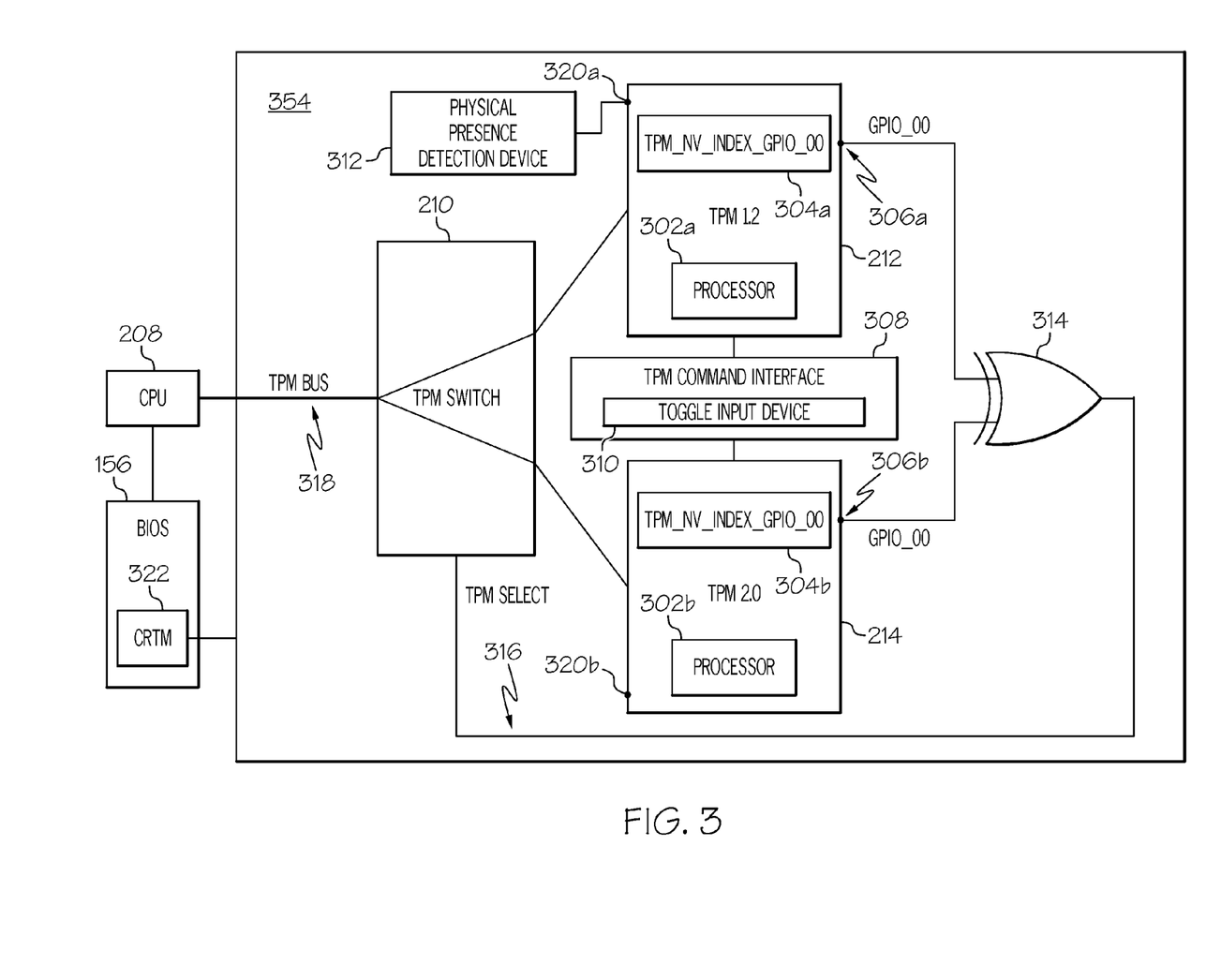
FIG. 3 depicts an exemplary Trusted Platform Module System (TPMS) according to one or more embodiments of the present invention.

Referring now to FIG. 3, an exemplary Trusted Platform Module System (TPMS) 354 (e.g., TPMS 154 depicted in FIG. 1) is presented in accordance with one or more embodiments of the present invention. Within TPMS 354 is a first Trusted Platform Module (TPM), depicted as TPM 212. TPM 212 is a hardware module that comprises a first secure cryptographic processor (depicted as processor 302a), which provides a first set of cryptology services as defined by a first TPM specification. That is, the cryptology services provided by TPM 212 are those described by Version 1.2 of the TPM specification. Examples of cryptology services provided by TPM 212 (as well as TPM 214) include the generation of random numbers, RSA keys, and SHA-1 keys, as well as an encryption-decryption-signature engine that uses such numbers/keys. TPM 212 and/or TPM 214 also include persistent memory, which stores endorsement keys, storage root keys, etc. Also within TPM 212 and/or TPM 214 is a non-volatile (NV) memory, in which are stored platform configuration registers (for storing metrics that describe the system to which the TPM is assigned/affixed), attestation identity keys (for encrypting hashes created from descriptors of hardware and software resources within the system), and storage keys (for encrypting and decrypting data being stored in hard drives within the system), as well as index memories that control the output (state) of one or more general purpose input/output (GPIO) pins on the TPM. All input/output to the cryptographic processors and memories within the TPM are via a secured input/output interface, which requires a trust relationship with the device/user who is accessing the TPM. Furthermore, however, the present invention requires a Physical Presence of a user to alter the contents of the index memories (e.g., registers).

Thus, within TPM 212 is a first index register, depicted as register 304a. Register 304a is a hardware register that controls a state of an output from a general purpose input/output (GPIO) pin (depicted as GPIO pin 306a) on the first TPM 212. That is, TPM 212 has one or more I/O pins that allow data to enter or exit TPM 212. If the data is entering TPM 212, then that data is written to register 304a. If the data is exiting TPM 212, then that data is read from register 304a. In the present invention, the data exiting TPM 212 refers to a state depicted in FIG. 4, which is discussed below.

Also within TPMS 354 is a second TPM, depicted as TPM 214. As discussed herein, TPM 214 follows a subsequent version (e.g., Version 2.0) of the TPM specification than that followed by TPM 212 (i.e., TPM 212 follows Version 1.2 of the TPM specification). Thus, while TPM 214 is a hardware module that comprises a second secure cryptographic processor (depicted as processor 302b) that is similar to processor 302a, this second secure cryptographic processor provides a second set of cryptology services as defined by a second TPM specification, wherein the second TPM specification is different from (e.g., subsequent to) the first TPM specification to which TPM 212 comports.

Also within TPMS 354 is a TPM command interface 308. TPM command interface 308 accesses General Purpose Input/Output (GPIO) pins (e.g., the depicted GPIO pins 306a and 306b) using a nonvolatile storage interface (not shown). The nonvolatile storage interface utilizes an index for mapping to particular storage locations in the nonvolatile storage. In one embodiment, each index is associated with a particular GPIO pin on a specific TPM.

One component/feature of the TPM command interface 308 is a toggle input device 310, which causes the state being output from the GPIO pin 306a on the first TPM (212) to switch from a first state to a second state, and/or from the second state to the first state. In one embodiment, the toggle input device 310 is an integral component of the TPM command interface 308, such that the TPM command interface 308 is the hardware/software/firmware entity that actually controls the toggling between TPMs as described herein. Similarly, toggle input device 310 causes the state being output from the GPIO pin 306b on the second TPM (214) to switch from the first state to the second state and/or from the second state to the first state. That is, assume that an entry within register 304a indicates that the output on GPIO 306a is a "1". Toggle input device 310 causes this entry to toggle (switch) from "1" (a first state) to a "0" (a second state). Re-toggling the toggle input device 310 causes this same entry to switch from "0" back to "1". Toggle input device 310 is able to adjust entries in the register 306b in TPM 214 in a same/similar manner. Note, however, that in one embodiment, such toggling is TPM-specific. That is, toggle input device 310 toggles an entry in register 304a or register 304b, but does not toggle the entries in both registers 304a-304b at once.

Also part of TPMS 354 is a physical presence detection device 312, which in one embodiment is also a component of TPM command interface 308, while in another embodiment is a separate device (as depicted). For purposes of clarity, only a single physical presence detection device 312 is depicted. However, each TPM (e.g., TPM 212 and TPM 214) has its own physical presence pins, depicted as physical presence pins 320a and 320b. In one embodiment, a single physical detection device 312 and/or activation thereof can be detected by physical presence pin 320a and/or physical presence pin 320b. That is, in one embodiment, the physical presence detection device 312 is limited to communicating with either physical presence pin 320a or physical presence pin 320b, but not both at the same time. In another embodiment, physical presence detection device 312 is able to simultaneously communicate with physical presence pin 320a and physical presence pin 320b at the same time. However, great control and granularity is afforded when only one TPM/physical presence pin is allowed to be in communication with the physical presence detection device 312 at a single time. Physical presence detection device 312 detects a local physical change to a computer system (e.g., chassis 202 and/or server blade 204 depicted in FIG. 2) to prove a local physical presence of a user at the computer system. That is, there are certain operations that require a user to be physically present at a device, such that these operations cannot be performed remotely. Examples of such operations by a user (i.e., a person) include, but are not limited to, manually pushing a button on a control panel of the system; connecting a jumper cable from one component to another component in the system; manually moving a dual in-line package (DIP) switch; etc. The operation is detected by the physical presence detection device 312 according to how the operation occurs. That is, if the local physical change (i.e., operation) to the system is a user pushing a button on a control panel indicating that he is physically present, then the physical presence of the user is simply the signal being generated by the control panel's button, which is then sent to the physical presence detection device 312. If the operation to the system is the user moving a DIP switch, then the movement (i.e., repositioning) of the DIP switch will generate a signal, which likewise is sent to the physical present detection device 312. Other operations, however, require more detailed monitoring activities by the physical presence detection device 312. For example, if the operation is to move a jumper cable (e.g., from a particular bus) from one device to another device (e.g., from one hard drive to another hard drive), then different signals will show up on that particular bus (e.g., new signals indicating the presence and/or identity of the new hard drive). The physical presence detection device 312 will then read these new signals to recognize (e.g., through the use of a lookup table) that a new hard drive has been connected by the jumper, which can only be accomplished by a user physically unclipping the jumper from the first (original) hard drive and clipping it to the second (new) hard drive.

In one embodiment of the present invention, proof of the local physical presence of the user is required by the toggle input device 310 to change the state, being output from the GPIO pin 306a on the first TPM 212, from the first state to the second state. That is, unless the physical presence detection device 312 detects a physical operation by a user at the system when a value within the register 304a and/or 304b is toggled (in one embodiment within a predetermined amount of time before the toggle operation and/or within a predetermined amount of time after the toggle operation), then the toggle operation is blocked, such that the output on the GPIO pin (306a or 306b) does not change. The change in the state (e.g., going from "0" to "1" or from "1" to "0") on one or both of the GPIO pins 306a-306b causes the system to toggle from one TPM to another. That is, the change in GPIO pin states causes the system to switch from using TPM 212 to using TPM 214, or to switch from using TPM 214 to TPM 212.

Figure 4:
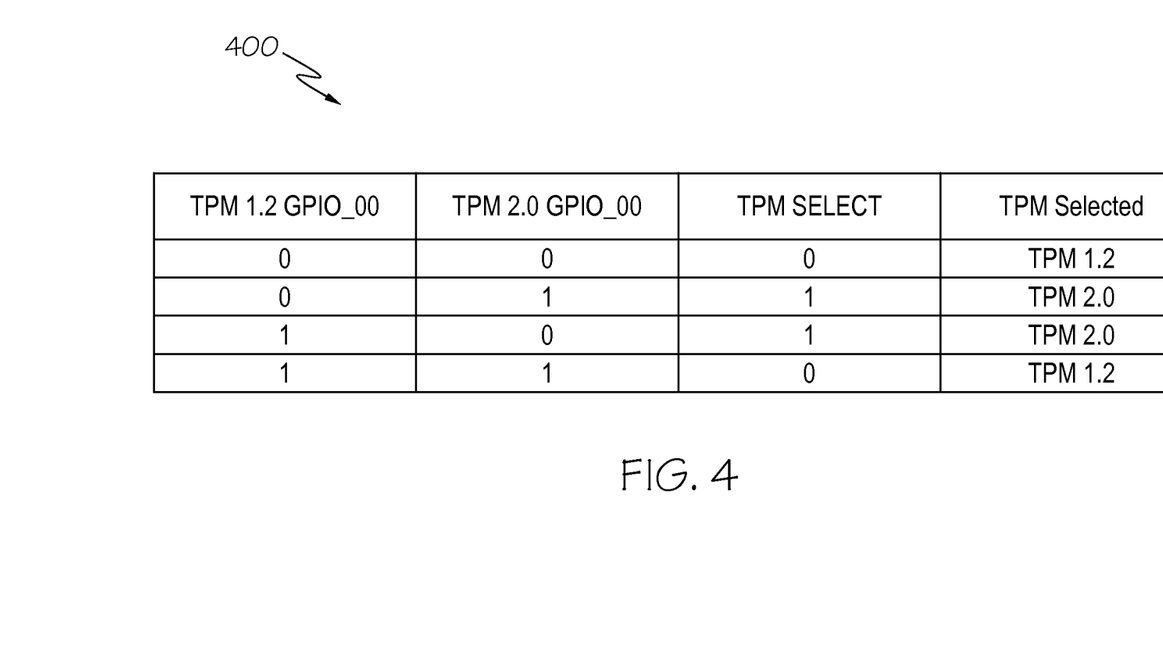
FIG. 4 is an exemplary truth table for selecting a particular Trusted Platform Module (TPM) according to outputs from multiple TPMs within a TPMS.

For example, consider the truth table 400 depicted in FIG. 4. Exemplary truth table 400 depicts GPIO pin states used to select a particular Trusted Platform Module (TPM) according to outputs from multiple TPMs within a TPMS. As a default condition, assume that the state of GPIO pin 306a (from TPM 1.2—212) is "0", and that the state of GPIO pin 306b (from TPM 2.0—214) is "0". In this case TPM 1.2 (212) is selected to be used in the computer system (i.e., is coupled to the CPU 208 depicted in FIG. 2 and FIG. 3). However, if the entry in the register 306b that controls the state of GPIO pin 306b switches from "0" to "1" (see the second line in truth table 400), then the system will switch from using TPM 1.2 (212) to TPM 2.0 (214). Similarly, if the entry in the register 306a that controls the state of GPIO pin 306a switches from "0" to "1" (see the third line in truth table 400), then the system will likewise switch from using TPM 1.2 (212) to TPM 2.0 (214). Thereafter, if the states of GPIO pins 306a and 306b both go high (i.e., the entry in one of registers 304a-304b changes using the toggle input device 310), then the system reverts back to TPM 1.2 (212).

Returning to FIG. 3, one embodiment of the present invention invokes the conditions found in truth table 400 (shown in FIG. 4) through the use of a hardware logic gate, such as exclusive OR (XOR) gate 314. That is, if the states of GPIO pins 306a and 306b are either both low ("0") or high ("1"), then the output from XOR 314 is low ("0"). This low signal is sent via line 316 to a control pin on the TPM switch 210, causing TPM 1.2 (212) to be coupled to CPU 208 via a TPM bus 318. However, if the states of GPIO pins 306a and 306b are disparate (i.e., one is high while the other is low), then a high signal is sent from XOR 314 to TPM switch 210, causing TPM 2.0 (214) to be coupled to CPU 208. Thus, in one embodiment, TPM switch 210 selectively couples the first TPM (212) or the second TPM (214) to a central processing unit (208) in the computer system, such that the TPM switch 210 switches a connection between the central processing unit 208 and the first TPM 212 to a connection between the central processing unit 208 and the second TPM 214 in response to the state being output from the GPIO pin 306a on the first TPM 212 changing from the first state to the second state. As described above, the same result occurs in response to the state being output from the GPIO pin 306b on the second TPM 214 changing from the first state to the second state. In either embodiment, the first state may be high or low, and the second state may be high or low, as long as the first state and the second state are different states (i.e., the first state is high and the second state is low, or the first state is low and the second state is high).

Note that in one or more embodiments of the present invention, only one TPM is active at any point in time, such that only the active TPM can control the toggling operations described herein. For example, assume that TPM 212 is initially active (e.g., is in communication with CPU 208). As such, only the contents of register 304a can be changed, thus causing the TPM switch 210 to toggle over to TPM 214 (in one embodiment, after rebooting the system, including TPMS 354). Thereafter, TPM 214 will be the active TPM for the system, such that only the contents of register 304b (and not the contents of register 304a) can be toggled, in order to cause the toggling back to TPM 212 upon a reboot.

Note also that CPU 208 is coupled to BIOS 156 (shown also in FIG. 1), and that BIOS 156 includes a Core Root of Trust for Measurement (CRTM) 322. CRTM 322 is part of the firmware that is BIOS 156. As the name implies, CRTM 322 is an inherently/implicitly trusted block of code within BIOS 156.

Trusted Computing protocols, such as that from the Trusted Computing Group (TCP), require a chain of trust. That is, an application must trust the operating system (OS) (e.g., OS 138) on which the application runs; and the operating system must trust the BIOS (e.g., BIOS 156) that loads the OS. In order to be able to trust BIOS 156, a "Root of Trust" is given to CRTM 322, which remains unchanged during the life of a TPM. This persistence in form allows the CRTM 322 to run before the rest of the code in the BIOS 156, thereby ensuring the authenticity/trustworthiness of the rest of BIOS 156.

As shown, CRTM 322 is in communication with TPMS 354. Thus, changes to register 304a and register 304b, as described herein, cause CRTM 322 to initiate toggling from one of the TPM modules to another TPM module (e.g., to cause TPM switch 210 to decouple TPM 1.2 (212) from CPU 208, while coupling TPM 2.0 214 to CPU 208) when CPU 208 reboots (and thus reads the contents of BIOS 156, including CRTM 322). Note that since the CRTM 322 initiates such toggling, the desired TPM is configured/connected before the rest of the BIOS 156 executes, such that the BIOS 156 properly records the configuration/connection to the appropriate TPM.

As described herein, the second TPM 214 is not backward compatible with the first TPM 212 due to the first set of cryptology services and the second set of cryptology services being mutually different from one another.

Note that in one embodiment, the TPM switch 210 is a multiplexer (MUX), such that the output from XOR 314 is a control signal that causes the MUX to selectively couple the CPU 208 to either TPM 212 or TPM 214.

Note that while only two TPMs are depicted in FIG. 3, in one embodiment multiple TPMs can be selectively chosen to be used by TPM switch 210.

Figure 5:
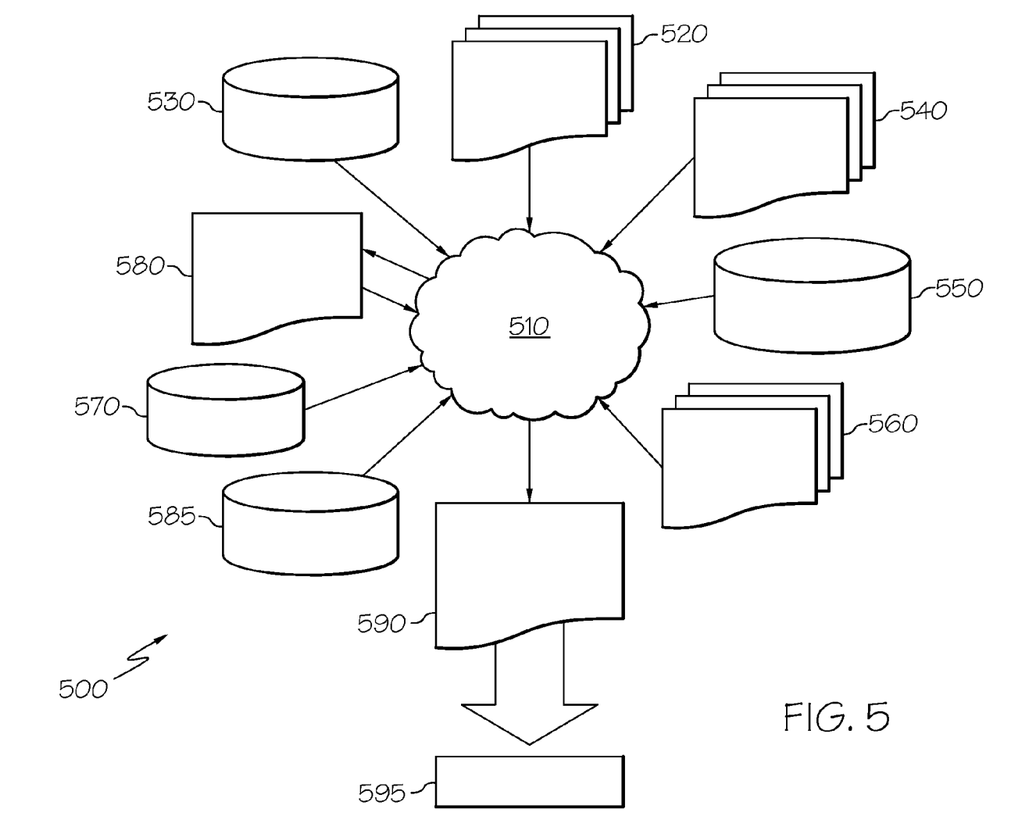
FIG. 5 is a flow diagram of a design process used in semiconductor design, manufacturing, and/or testing of the presently described exemplary TPMS system.

FIG. 5 is a flow diagram of a design process used in semiconductor design, manufacturing, and/or testing of the presently described exemplary TPMS system; and With reference now to FIG. 5, there is depicted a block diagram of an exemplary design flow 500 used for example, in semiconductor IC logic design, simulation, testing, layout, and manufacturing. Design flow 500 includes processes, machines and/or mechanisms for processing design structures or devices to generate logically or otherwise functionally equivalent representations of the design structures and/or devices described above and shown in FIGS. 2-3. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 2-3. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 2-3 to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 590 may comprise a compiled, executable HDL simulation model that functionally simulates the devices shown in FIGS. 2-3.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-3. Design structure 590 may then proceed to a stage 595 where, for example, design structure 590: proceeds to tape-out, is released to manufacturing, is released to a mask house, is sent to another design house, is sent back to the customer, etc.

Figure 6:
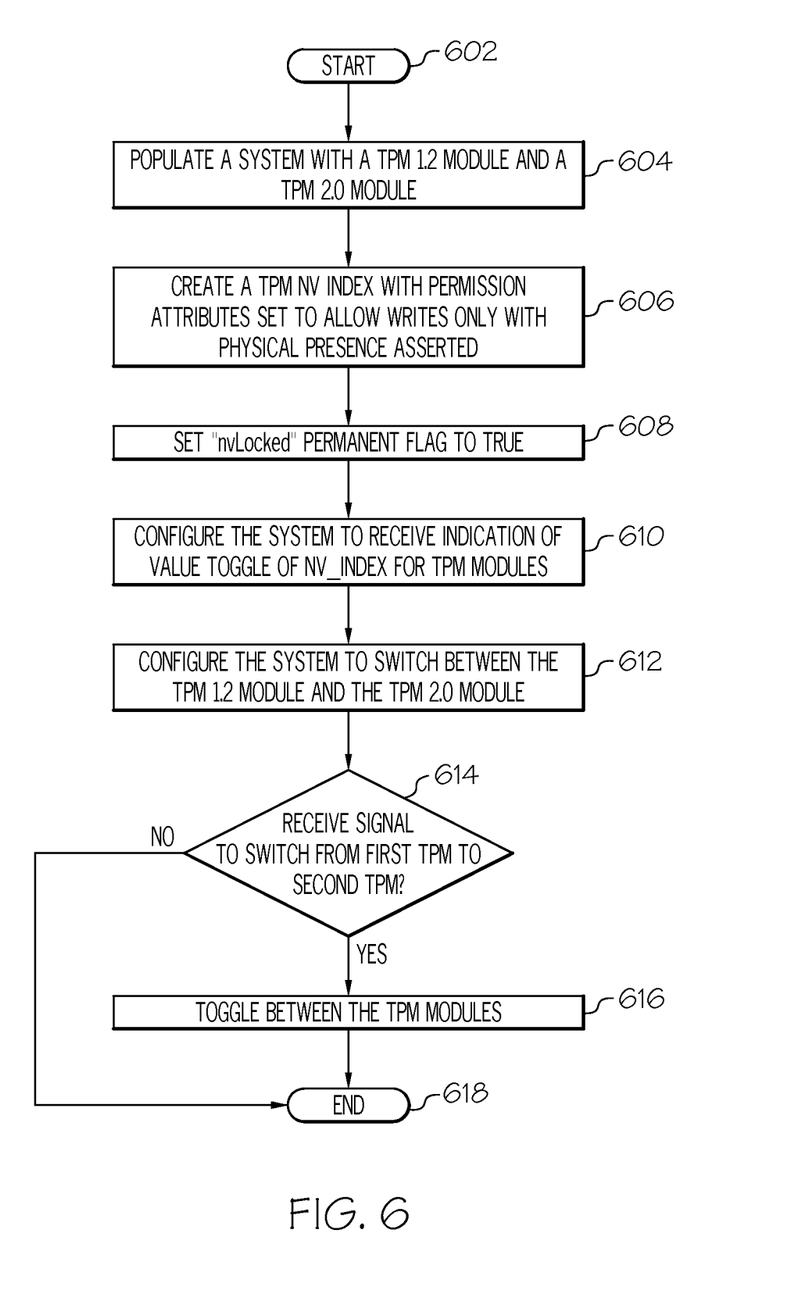
FIG. 6 is a high-level flow chart of one or more hardware-executed steps taken to select a particular TPM in a computer system.

With reference now to FIG. 6, a high-level flow chart of one or more hardware-executed steps taken to select a particular TPM in a computer system (i.e., by toggling between Trusted Platform Modules (TPMs) in a computer system, where the computer system comprises a Trusted Platform Module System (TPMS)), is presented. After initiator block 602, a system is populated with both a TPM 1.2 module and a TPM 2.0 module (i.e., TPMs that comport with different versions of the TPM specification), as described in block 604.

As described in block 606, one or more processors populate TPM NV (non-volatile storage locations) registers in the two TPM modules. That is, one or more processors populate a first index register within a first TPM, wherein the first TPM is a hardware module within the computer system, wherein the first TPM comprises a first secure cryptographic processor that provides a first set of cryptology services as defined by a first TPM specification, and wherein the first index register is a hardware register that stores a state of an output from a general purpose input/output (GPIO) pin on the first TPM. Similarly, one or more processors, populate a second index register within a second TPM, wherein the second TPM is a hardware module that comprises a second secure cryptographic processor that provides a second set of cryptology services as defined by a second TPM specification, that is subsequent to the first TPM specification, and wherein the second index register is a hardware register that stores a state of an output from a general purpose input/output (GPIO) pin on the second TPM. As described further in block 606, a physical presence input device must receive a local physical change signal that proves a local physical presence of a user at the computer system, in order to allow writes to the index register(s). Thus, as described in block 608, the "nvLocked" permanent flag for the index register(s) is set to TRUE, thus locking (i.e., preventing changes to) the values in the index register(s). By setting the "nvLocked" permanent flag for the index register(s) to TRUE, then only the assertion of the user's Physical Presence (i.e., a signal proves the physical presence of the user at the location of the system) allows the contents of the NV index (e.g., register 304a or register 304b) to be changed, thus causing the switching from one TPM to another TPM, as described herein. This prevents remote switching from one TPM to another TPM, which could adversely affect the system's security.

As described in block 610, the system is further configured to receive, by a hardware toggle input device, a signal indicating that the state being output from the GPIO pin on the first TPM is being switched from a first state to a second state, by toggling (changing) the values in one of the index registers. Again, note that the local physical change to the physical present input device is required by the hardware toggle input device in order to change the state being output from the GPIO pin on the first TPM from the first state to the second state.

As described in block 612, the system is further configured to selectively couple, by a TPM switch, the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state.

Thus, as depicted in query block 614, a query is made as to whether a signal has been received indicating a command/request/desire to switch from one TPM to another TPM. For example, a user (e.g., an Information Technology (IT) professional) may input a signal indicating that he/she desires to switch from using a TPM 1.2 module (in current use) to a TPM 2.0 module, or to switch from a TPM 2.0 module (in current use) to a TPM 1.2 module. If such a signal is received, then the system will toggle from the TPM module that is currently in use (e.g., the TPM 1.2 module) to the TPM module that is currently not in use (e.g., the TPM 2.0 module).

In one embodiment, toggling between TPM modules is under the control of BIOS, and more specifically the CRTM described in FIG. 3. That is, after the system receives a signal indicating that the system needs to switch from a first TPM module to a second TPM module, the system will 1) load the appropriate settings within the CRTM indicating which TPM module is to be used, and then will 2) reboot, causing these settings to be read, such that the appropriate TPM module toggling (switching from one TPM module to another TPM module) occurs.

The process ends at terminator block 618.

Again, note that in one embodiment, the second TPM is not backward compatible with the first TPM due to the first set of cryptology services and the second set of cryptology services being mutually different from one another.

In one embodiment, the method further comprises receiving, at a hardware logic gate, inputs to the hardware logic gate, wherein the inputs are outputs from the first TPM and the second TPM, and wherein an output from the hardware logic gate controls the TPM switch to selectively couple the first TPM or the second TPM to the central processing unit in the computer system, as described in FIG. 3. As depicted in FIG. 3, in one embodiment the hardware logic gate is an exclusive OR (XOR) gate, and the TPM switch is a multiplexer (MUX).

As described herein, in one embodiment of the presently described method, the computer system is a blade chassis, wherein the computer system further comprises: a backplane; and a server blade coupled to the backplane, wherein the TPMS is a component of the server blade (see FIG. 2).

As described herein, in one embodiment the method further comprises: switching, by the toggle input device, a state being output from a GPIO pin on the second TPM to switch from the first state to the second state; and selectively switching, by the TPM switch, a connection between the central processing unit and the second TPM to a connection between the central processing unit and the first TPM in response to the state being output from the GPIO pin on the second TPM changing from the first state to the second state.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer system, wherein the computer system comprises a Trusted Platform Module System (TPMS), and wherein the TPMS comprises:
    a first Trusted Platform Module (TPM), wherein the first TPM is a hardware module that comprises a first secure cryptographic processor that provides a first set of cryptology services as defined by a first TPM specification;
    a first index register within the first TPM, wherein the first index register is a hardware register that controls a state of an output from a general purpose input/output (GPIO) pin on the first TPM;
    a second TPM, wherein the second TPM is a hardware module that comprises a second secure cryptographic processor that provides a second set of cryptology services as defined by a second TPM specification, wherein the second TPM specification is different from the first TPM specification;
    a toggle input device, wherein the toggle input device causes the state being output from the GPIO pin on the first TPM to switch from a first state to a second state;
    a physical presence detection device, wherein the physical presence detection device detects a local physical change to the computer system to prove a local physical presence of a user at the computer system, and wherein proof of the local physical presence of the user is required by the toggle input device to change the state, being output from the GPIO pin on the first TPM, from the first state to the second state;
    a TPM switch for selectively coupling the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state; and
    a hardware logic gate, wherein inputs to the hardware logic gate are outputs from the first TPM and the second TPM, and wherein an output from the hardware logic gate controls the TPM switch to selectively couple the first TPM or the second TPM to the central processing unit in the computer system.

2. The computer system of claim 1, wherein the second TPM is not backward compatible with the first TPM due to the first set of cryptology services and the second set of cryptology services being mutually different from one another.

3. The computer system of claim 1, wherein the hardware logic gate is an exclusive OR (XOR) gate.

4. The computer system of claim 1, wherein the TPM switch is a multiplexer (MUX).

5. The computer system of claim 1, wherein the computer system is a blade chassis, and wherein the computer system further comprises:
    a backplane; and
    a server blade coupled to the backplane, wherein the TPMS is a component of the server blade.

6. The computer system of claim 1, wherein the second TPM contains a second index register, wherein the second index register is a hardware register that controls a state of an output from a general purpose input/output (GPIO) pin on the second TPM, wherein the toggle input device causes a state being output from the GPIO pin on the second TPM to switch from the first state to the second state, and wherein the TPM switch selectively switches the connection between the central processing unit and the second TPM to a new connection between the central processing unit and the first TPM in response to the state being output from the GPIO pin on the second TPM changing from the first state to the second state.

7. A non-transitory machine-readable data storage medium having a hardware description language (HDL) design structure encoded thereon, said HDL design structure comprising elements that, when processed in a computer-aided design system, generate a machine-executable representation of a system, wherein said system comprises a Trusted Platform Module System (TPMS), and wherein the TPMS comprises:
    a first Trusted Platform Module (TPM), wherein the first TPM is a hardware module that comprises a first secure cryptographic processor that provides a first set of cryptology services as defined by a first TPM specification;
    a first index register within the first TPM, wherein the first index register is a hardware register that controls a state of an output from a general purpose input/output (GPIO) pin on the first TPM;
    a second TPM, wherein the second TPM is a hardware module that comprises a second secure cryptographic processor that provides a second set of cryptology services as defined by a second TPM specification, wherein the second TPM specification is different from the first TPM specification;
    a toggle input device, wherein the toggle input device causes the state being output from the GPIO pin on the first TPM to switch from a first state to a second state;
    a physical presence detection device, wherein the physical presence detection device detects a local physical change to the computer system to prove a local physical presence of a user at the computer system, and wherein proof of the local physical presence of the user is required by the toggle input device to change the state, being output from the GPIO pin on the first TPM, from the first state to the second state;
    a TPM switch for selectively coupling the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state; and
    a hardware logic gate, wherein inputs to the hardware logic gate are outputs from the first TPM and the second TPM, and wherein an output from the hardware logic gate controls the TPM switch to selectively couple the first TPM or the second TPM to the central processing unit in the computer system.

8. The non-transitory machine-readable data storage medium of claim 7, wherein the second TPM is not backward compatible with the first TPM due to the first set of cryptology services and the second set of cryptology services being mutually different from one another.

9. The non-transitory machine-readable data storage medium of claim 7, wherein the hardware logic gate is an exclusive OR (XOR) gate.

10. The non-transitory machine-readable data storage medium of claim 7, wherein the TPM switch is a multiplexer (MUX).

11. The non-transitory machine-readable data storage medium of claim 7, wherein the second TPM contains a second index register, wherein the second index register is a hardware register that controls a state of an output from a general purpose input/output (GPIO) pin on the second TPM, wherein the toggle input device causes a state being output from the GPIO pin on the second TPM to switch from the first state to the second state, and wherein the TPM switch selectively switches the connection between the central processing unit and the second TPM to a new connection between the central processing unit and the first TPM in response to the state being output from the GPIO pin on the second TPM changing from the first state to the second state.

12. A method of toggling between Trusted Platform Modules (TPMs) in a computer system, wherein the computer system comprises a Trusted Platform Module System (TPMS), and wherein the method comprises:
    populating, by one or more hardware processors, a first index register within a first TPM, wherein the first TPM is a hardware module within the computer system, wherein the first TPM comprises a first secure cryptographic processor that provides a first set of cryptology services as defined by a first TPM specification, and wherein the first index register is a hardware register that stores a state of an output from a general purpose input/output (GPIO) pin on the first TPM;
    populating, by one or more hardware processors, a second index register within a second TPM, wherein the second TPM is a hardware module that comprises a second secure cryptographic processor that provides a second set of cryptology services as defined by a second TPM specification, that is subsequent to the first TPM specification, and wherein the second index register is a hardware register that stores a state of an output from a general purpose input/output (GPIO) pin on the second TPM;
    receiving, by a physical presence input device, a local physical change signal that proves a local physical presence of a user at the computer system;
    receiving, by a hardware toggle input device, a signal indicating that the state being output from the GPIO pin on the first TPM is being switched from a first state to a second state, wherein the local physical change to the physical present input device is required by the hardware toggle input device to change the state being output from the GPIO pin on the first TPM from the first state to the second state;
    selectively coupling, by a TPM switch, the first TPM or the second TPM to a central processing unit in the computer system, wherein the TPM switch switches a connection between the central processing unit and the first TPM to a connection between the central processing unit and the second TPM in response to the state being output from the GPIO pin on the first TPM changing from the first state to the second state; and
    receiving, at a hardware logic gate, inputs to the hardware logic gate, wherein the inputs are outputs from the first TPM and the second TPM, and wherein an output from the hardware logic gate controls the TPM switch to selectively couple the first TPM or the second TPM to the central processing unit in the computer system.

13. The method of claim 12, wherein the second TPM is not backward compatible with the first TPM due to the first set of cryptology services and the second set of cryptology services being mutually different from one another.

14. The method of claim 12, wherein the hardware logic gate is an exclusive OR (XOR) gate.

15. The method of claim 12, wherein the TPM switch is a multiplexer (MUX).

16. The method of claim 12, wherein the computer system is a blade chassis, and wherein the computer system further comprises:
    a backplane; and
    a server blade coupled to the backplane, wherein the TPMS is a component of the server blade.

17. The method of claim 12, further comprising:
    switching, by the toggle input device, a state being output from a GPIO pin on the second TPM to switch from the first state to the second state; and
    selectively switching, by the TPM switch, a connection between the central processing unit and the second TPM to a connection between the central processing unit and the first TPM in response to the state being output from the GPIO pin on the second TPM changing from the first state to the second state.

\* \* \* \* \*